United States Patent
Bishop et al.

(10) Patent No.: US 7,617,229 B2
(45) Date of Patent: Nov. 10, 2009

(54) MANAGEMENT AND USE OF DATA IN A COMPUTER-GENERATED DOCUMENT

(75) Inventors: Andrew Bishop, Redmond, WA (US); Ashley Morgan, Santa Clara, CA (US); Brian Jones, Redmond, WA (US); Chad Rothschiller, Edmonds, WA (US); Charles S. Walker, Sammamish, WA (US); Eoin Burke, Seattle, WA (US); Josh Pollock, Seattle, WA (US); Robert Little, Redmond, WA (US); Sharad K. Garg, Fremont, CA (US); Shawn Alan Villaron, San Jose, CA (US); Su-Piao Bill Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 135 days.

(21) Appl. No.: 11/019,088

(22) Filed: Dec. 20, 2004

(65) Prior Publication Data

US 2006/0136477 A1    Jun. 22, 2006

(51) Int. Cl.
    *G06F 7/00* (2006.01)
(52) U.S. Cl. .................................. 707/101; 707/103 Y
(58) Field of Classification Search ................. 707/100, 707/101, 102, 104.1, 103 R, 103 Y
    See application file for complete search history.

(56) References Cited

U.S. PATENT DOCUMENTS

| 4,410,286 | A | 10/1983 | Ko et al. |
| 4,594,674 | A | 6/1986 | Boulia et al. |
| 4,649,513 | A | 3/1987 | Martin et al. |
| 4,870,611 | A | 9/1989 | Martin et al. |
| 5,222,205 | A | 6/1993 | Larson et al. |
| 5,267,155 | A | 11/1993 | Buchanan et al. |
| 5,469,533 | A | 11/1995 | Dennis |
| 5,487,138 | A | 1/1996 | Rust et al. |

(Continued)

FOREIGN PATENT DOCUMENTS

EP    1 376 387 A2    1/2004

(Continued)

OTHER PUBLICATIONS

Bauer M. et al., "Open Office Specification 1.0," Online Publication, Mar. 22, 2004, XP002404030; Retrieved from the Internet: URL: http://www.oasis-open.org/comittees/download.php/6037/office-spec-1.0-cd-1.pdf on Oct. 20, 2006, 607 pp.*

(Continued)

*Primary Examiner*—Don Wong
*Assistant Examiner*—Angela M Lie
(74) *Attorney, Agent, or Firm*—Merchant & Gould P.C.

(57) ABSTRACT

Methods and systems provide for breaking a computer-generated document into a number of components where the components have explicit relationships with each other. A relationship representation is generated for the components of the document. A user may then navigate the relationships between the components to quickly understand the nature of the document and its components and to locate particular portions of the document that are important to the user. In addition, the user may open, edit and reuse particular components of the document apart from the rest of the document and without having to open or edit the document.

12 Claims, 4 Drawing Sheets

U.S. PATENT DOCUMENTS

| | | |
|---|---|---|
| 5,537,526 A | 7/1996 | Anderson et al. |
| 5,579,466 A | 11/1996 | Habib et al. |
| 5,579,519 A | 11/1996 | Pelletier |
| 5,613,124 A | 3/1997 | Atkinson et al. |
| 5,655,130 A | 8/1997 | Dodge et al. |
| 5,675,788 A | 10/1997 | Husick et al. |
| 5,701,342 A | 12/1997 | Anderson et al. |
| 5,745,910 A | 4/1998 | Piersol et al. |
| 5,752,055 A | 5/1998 | Redpath et al. |
| 5,752,056 A | 5/1998 | Celik |
| 5,819,295 A | 10/1998 | Nakagawa et al. |
| 5,845,058 A | 12/1998 | Shaw et al. |
| 5,893,109 A | 4/1999 | DeRose et al. |
| 5,903,903 A | 5/1999 | Kennedy |
| 5,903,905 A | 5/1999 | Andersen et al. |
| 5,905,504 A | 5/1999 | Barkans et al. |
| 5,911,776 A | 6/1999 | Guck |
| 5,950,215 A | 9/1999 | Tabuchi |
| 5,960,168 A | 9/1999 | Shaw et al. |
| 5,993,088 A | 11/1999 | Nogay et al. |
| 6,023,714 A | 2/2000 | Hill et al. |
| 6,026,416 A | 2/2000 | Kanerva et al. |
| 6,067,531 A | 5/2000 | Hoyt et al. |
| 6,094,665 A | 7/2000 | Lyons et al. |
| 6,134,552 A | 10/2000 | Fritz et al. |
| 6,144,974 A | 11/2000 | Gartland |
| 6,175,845 B1 | 1/2001 | Smith et al. |
| 6,182,080 B1 | 1/2001 | Clements |
| 6,182,096 B1 | 1/2001 | Mastie et al. |
| 6,199,082 B1 | 3/2001 | Ferrel et al. |
| 6,212,530 B1 | 4/2001 | Kadlec |
| 6,247,018 B1 | 6/2001 | Rheaume |
| 6,247,066 B1 | 6/2001 | Tanaka |
| 6,269,403 B1 | 7/2001 | Anders et al. |
| 6,342,904 B1 | 1/2002 | Vasudevan et al. |
| 6,362,870 B2 | 3/2002 | Mui et al. |
| 6,393,441 B1 | 5/2002 | Kanerva et al. |
| 6,407,821 B1 | 6/2002 | Hohensee et al. |
| 6,418,448 B1 | 7/2002 | Sarkar |
| 6,449,653 B2 | 9/2002 | Klemets et al. |
| 6,457,017 B2 | 9/2002 | Watkins et al. |
| 6,480,206 B2 | 11/2002 | Prinzing |
| 6,484,189 B1 | 11/2002 | Gerlach et al. |
| 6,496,206 B1 | 12/2002 | Mernyk et al. |
| 6,507,856 B1 | 1/2003 | Kanerva et al. |
| 6,509,974 B1 | 1/2003 | Hansen |
| 6,538,760 B1 | 3/2003 | deBry et al. |
| 6,549,918 B1 | 4/2003 | Probert, Jr. et al. |
| 6,583,789 B1 | 6/2003 | Carlson et al. |
| 6,591,278 B1 | 7/2003 | Ernst |
| 6,604,144 B1 | 8/2003 | Anders |
| 6,608,693 B1 | 8/2003 | Loyd et al. |
| 6,609,200 B2 | 8/2003 | Anderson et al. |
| 6,654,737 B1 | 11/2003 | Nunez |
| 6,657,647 B1 | 12/2003 | Bright |
| 6,658,477 B1 | 12/2003 | Lisitsa et al. |
| 6,674,540 B1 | 1/2004 | Wiechers et al. |
| 6,675,353 B1 | 1/2004 | Friedman |
| 6,675,356 B1 | 1/2004 | Adler et al. |
| 6,681,223 B1 | 1/2004 | Sundaresan |
| 6,694,485 B1 | 2/2004 | Kelley et al. |
| 6,715,126 B1 | 3/2004 | Chang et al. |
| 6,763,343 B1 | 7/2004 | Brooke et al. |
| 6,771,291 B1 | 8/2004 | DiStefano, III |
| 6,781,609 B1 | 8/2004 | Barker et al. |
| 6,785,673 B1 | 8/2004 | Fernandez |
| 6,789,229 B1 | 9/2004 | Dunietz et al. |
| 6,812,941 B1 | 11/2004 | Brown et al. |
| 6,871,321 B2 | 3/2005 | Wakayama |
| 6,910,843 B2 | 6/2005 | Saw et al. |
| 6,912,555 B2 | 6/2005 | Lemon et al. |
| 6,918,082 B1 | 7/2005 | Gross et al. |
| 6,925,597 B2 | 8/2005 | Anwar |
| 6,925,631 B2 | 8/2005 | Golden |
| 6,931,590 B2 | 8/2005 | Kanie et al. |
| 6,938,203 B1 | 8/2005 | Dimarco et al. |
| 6,952,801 B2 | 10/2005 | Warmus et al. |
| 6,961,902 B2 | 11/2005 | Anecki et al. |
| 6,981,207 B1 | 12/2005 | Bakman et al. |
| 7,051,276 B1 | 5/2006 | Mogilevsky et al. |
| 7,054,841 B1 | 5/2006 | Tenorio |
| 7,080,083 B2 | 7/2006 | Kim et al. |
| 7,134,071 B2 | 11/2006 | Ohwada et al. |
| 7,168,035 B1 | 1/2007 | Bell et al. |
| 7,171,618 B2 | 1/2007 | Harrington et al. |
| 7,301,544 B2 | 11/2007 | Yuan |
| 7,412,649 B2 | 8/2008 | Emek et al. |
| 7,418,652 B2 | 8/2008 | Ornstein et al. |
| 7,487,448 B2 | 2/2009 | Emerson et al. |
| 7,549,118 B2 | 6/2009 | Shur et al. |
| 2001/0003828 A1 | 6/2001 | Peterson et al. |
| 2001/0013043 A1 | 8/2001 | Wagner |
| 2001/0016842 A1 | 8/2001 | Umen et al. |
| 2001/0018697 A1 | 8/2001 | Kunitake et al. |
| 2001/0034739 A1 | 10/2001 | Anecki et al. |
| 2001/0039552 A1 | 11/2001 | Killi et al. |
| 2001/0044809 A1 | 11/2001 | Parasnis et al. |
| 2001/0044813 A1 | 11/2001 | Frank |
| 2001/0051962 A1 | 12/2001 | Piotkin |
| 2001/0054042 A1 | 12/2001 | Watkins et al. |
| 2002/0004805 A1 | 1/2002 | Nojima et al. |
| 2002/0016800 A1 | 2/2002 | Spivak et al. |
| 2002/0038348 A1* | 3/2002 | Malone et al. ............... 709/217 |
| 2002/0049790 A1 | 4/2002 | Ricker et al. |
| 2002/0059265 A1 | 5/2002 | Valorose |
| 2002/0059337 A1 | 5/2002 | Takaoka et al. |
| 2002/0065848 A1* | 5/2002 | Walker et al. ................ 707/511 |
| 2002/0065857 A1 | 5/2002 | Michalewicz |
| 2002/0073236 A1 | 6/2002 | Helgeson et al. |
| 2002/0087602 A1 | 7/2002 | Masuda et al. |
| 2002/0099797 A1 | 7/2002 | Merrell et al. |
| 2002/0103835 A1 | 8/2002 | Kearney |
| 2002/0107886 A1 | 8/2002 | Gentner et al. |
| 2002/0111133 A1 | 8/2002 | Wittkotter |
| 2002/0116421 A1 | 8/2002 | Fox et al. |
| 2002/0120647 A1 | 8/2002 | Amano |
| 2002/0129058 A1 | 9/2002 | Story et al. |
| 2002/0174145 A1 | 11/2002 | Duga et al. |
| 2002/0184263 A1 | 12/2002 | Perinet et al. |
| 2002/0188638 A1 | 12/2002 | Hamscher |
| 2002/0194220 A1 | 12/2002 | Sluiman |
| 2003/0004957 A1 | 1/2003 | Broman et al. |
| 2003/0023637 A1 | 1/2003 | Halahmi |
| 2003/0028560 A1 | 2/2003 | Kudrolli et al. |
| 2003/0033287 A1 | 2/2003 | Shanahan et al. |
| 2003/0065946 A1 | 4/2003 | Holliday et al. |
| 2003/0074633 A1 | 4/2003 | Boulmakoul et al. |
| 2003/0079181 A1 | 4/2003 | Schumacher et al. |
| 2003/0093520 A1 | 5/2003 | Beesley |
| 2003/0115547 A1 | 6/2003 | Ohwada et al. |
| 2003/0120671 A1 | 6/2003 | Kim et al. |
| 2003/0126136 A1 | 7/2003 | Omoigui |
| 2003/0126260 A1 | 7/2003 | Husain et al. |
| 2003/0137539 A1 | 7/2003 | Dees |
| 2003/0137691 A1 | 7/2003 | Tanaka |
| 2003/0142128 A1 | 7/2003 | Reulein et al. |
| 2003/0145134 A1 | 7/2003 | Wehage et al. |
| 2003/0149934 A1 | 8/2003 | Worden ..................... 715/513 |
| 2003/0149935 A1 | 8/2003 | Takizawa et al. ............ 715/513 |
| 2003/0158851 A1 | 8/2003 | Britton et al. |
| 2003/0163552 A1 | 8/2003 | Savitzky et al. |
| 2003/0167446 A1 | 9/2003 | Thomas ..................... 715/513 |
| 2003/0172168 A1 | 9/2003 | Mak et al. |
| 2003/0172343 A1 | 9/2003 | Leymaster et al. |

| | | |
|---|---|---|
| 2003/0177446 A1 | 9/2003 | Gropper et al. |
| 2003/0177449 A1 | 9/2003 | Rose ......................... 715/530 |
| 2003/0182450 A1 | 9/2003 | Ong et al. |
| 2003/0182656 A1 | 9/2003 | Leathers et al. |
| 2003/0195784 A1 | 10/2003 | Smith |
| 2003/0196176 A1 | 10/2003 | Abu-Ghazalah et al. |
| 2003/0221167 A1 | 11/2003 | Goldstein et al. ........... 715/513 |
| 2003/0222890 A1 | 12/2003 | Salesin et al. |
| 2003/0229845 A1 | 12/2003 | Salesin et al. |
| 2003/0233420 A1 | 12/2003 | Stark et al. |
| 2003/0237048 A1 | 12/2003 | Jones et al. |
| 2003/0237049 A1 | 12/2003 | Sawicki et al. |
| 2004/0003343 A1 | 1/2004 | Liao et al. |
| 2004/0003388 A1 | 1/2004 | Jacquemot et al. |
| 2004/0015782 A1 | 1/2004 | Day et al. |
| 2004/0015890 A1 | 1/2004 | Wong et al. |
| 2004/0015908 A1 | 1/2004 | Giel et al. |
| 2004/0019853 A1 | 1/2004 | Takizawa et al. ............ 715/523 |
| 2004/0030711 A1 | 2/2004 | Roudot |
| 2004/0030987 A1 | 2/2004 | Manelli |
| 2004/0034848 A1 | 2/2004 | Moore et al. |
| 2004/0049737 A1 | 3/2004 | Simon et al. |
| 2004/0054669 A1 | 3/2004 | Seyrat et al. |
| 2004/0054967 A1 | 3/2004 | Brandenberger |
| 2004/0066527 A1 | 4/2004 | Kloosterman et al. |
| 2004/0078755 A1 | 4/2004 | Shinjo et al. |
| 2004/0088332 A1 | 5/2004 | Lee et al. |
| 2004/0103073 A1 | 5/2004 | Blake et al. |
| 2004/0117733 A1 | 6/2004 | Moreau et al. |
| 2004/0128535 A1 | 7/2004 | Cheng |
| 2004/0128623 A1 | 7/2004 | Hudson |
| 2004/0139049 A1 | 7/2004 | Hancock et al. |
| 2004/0148278 A1 | 7/2004 | Milo et al. |
| 2004/0148567 A1 | 7/2004 | Jeon et al. |
| 2004/0153467 A1 | 8/2004 | Conover et al. |
| 2004/0172584 A1 | 9/2004 | Jones et al. |
| 2004/0172592 A1 | 9/2004 | Collie et al. |
| 2004/0181753 A1 | 9/2004 | Michaelides |
| 2004/0183837 A1 | 9/2004 | Watanabe et al. |
| 2004/0194025 A1 | 9/2004 | Hubert et al. |
| 2004/0205533 A1 | 10/2004 | Lopata et al. |
| 2004/0205539 A1 | 10/2004 | Mak et al. |
| 2004/0205580 A1 | 10/2004 | De Angelis et al. |
| 2004/0205623 A1 | 10/2004 | Weil et al. |
| 2004/0205653 A1 | 10/2004 | Hadfield et al. |
| 2004/0205656 A1 | 10/2004 | Reulein et al. |
| 2004/0216048 A1 | 10/2004 | Brown et al. |
| 2004/0221233 A1 | 11/2004 | Thielen |
| 2004/0226012 A1 | 11/2004 | Awada et al. |
| 2004/0230894 A1 | 11/2004 | Elza et al. |
| 2004/0243551 A1 | 12/2004 | Boone et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0022113 A1 | 1/2005 | Hanlon |
| 2005/0063010 A1 | 3/2005 | Giannetti |
| 2005/0066335 A1 | 3/2005 | Aarts ......................... 719/316 |
| 2005/0071385 A1 | 3/2005 | Rao |
| 2005/0071755 A1 | 3/2005 | Harrington et al. |
| 2005/0091574 A1 | 4/2005 | Maaniitty et al. |
| 2005/0091575 A1 | 4/2005 | Relyea et al. |
| 2005/0099398 A1 | 5/2005 | Garside et al. |
| 2005/0105116 A1 | 5/2005 | Kobashi |
| 2005/0108001 A1 | 5/2005 | Aarskog |
| 2005/0108212 A1 | 5/2005 | Karimisetty et al. ........... 707/3 |
| 2005/0108278 A1 | 5/2005 | Jones et al. |
| 2005/0120061 A1 | 6/2005 | Kraft |
| 2005/0125720 A1 | 6/2005 | Little et al. |
| 2005/0125728 A1 | 6/2005 | Peiro et al. |
| 2005/0132279 A1 | 6/2005 | Relyea et al. |
| 2005/0144556 A1 | 6/2005 | Petersen et al. |
| 2005/0177784 A1 | 8/2005 | Andrews et al. |
| 2005/0192813 A1 | 9/2005 | Richard |
| 2005/0198561 A1 | 9/2005 | McAuley |
| 2005/0204016 A1 | 9/2005 | McAuley |
| 2005/0210026 A1 | 9/2005 | Wood |
| 2005/0223312 A1 | 10/2005 | Erdtmann et al. |
| 2005/0246724 A1 | 11/2005 | Foehr et al. |
| 2005/0248790 A1 | 11/2005 | Ornstein et al. |
| 2005/0249536 A1 | 11/2005 | Sedky et al. |
| 2005/0251739 A1 | 11/2005 | Shur et al. |
| 2005/0251740 A1 | 11/2005 | Shur et al. |
| 2005/0251742 A1 | 11/2005 | Mogilevsky et al. |
| 2005/0268221 A1 | 12/2005 | Shur et al. |
| 2005/0278616 A1 | 12/2005 | Eller |
| 2005/0278626 A1 | 12/2005 | Malik |
| 2006/0010371 A1 | 1/2006 | Shur et al. |
| 2006/0025091 A1 | 2/2006 | Buford |
| 2006/0026585 A1 | 2/2006 | Haselden et al. |
| 2006/0031749 A1 | 2/2006 | Schramm et al. |
| 2006/0031758 A1 | 2/2006 | Shur et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0080314 A1 | 4/2006 | Hubert et al. |
| 2006/0080316 A1 | 4/2006 | Gilmore et al. |
| 2006/0080603 A1 | 4/2006 | Bailey et al. |
| 2006/0095834 A1 | 5/2006 | Jeon et al. |
| 2006/0117019 A1 | 6/2006 | Sylthe et al. |
| 2006/0136809 A1* | 6/2006 | Fernstrom ................... 715/505 |
| 2006/0155529 A1 | 7/2006 | Ludviksson et al. |
| 2006/0168562 A1 | 7/2006 | Emek et al. |
| 2006/0206794 A1 | 9/2006 | Ornstein et al. |
| 2006/0227150 A1 | 10/2006 | Yuan |
| 2007/0061384 A1 | 3/2007 | Harrington et al. |
| 2007/0136443 A1 | 6/2007 | Sah et al. |
| 2007/0136662 A1* | 6/2007 | Khaba ........................ 715/530 |

FOREIGN PATENT DOCUMENTS

| | | |
|---|---|---|
| EP | 1 452 966 A2 | 11/2004 |
| WO | WO 99/01802 A2 | 1/1999 |
| WO | WO 01/44932 A1 | 6/2001 |
| WO | WO 01/80044 A2 | 10/2001 |
| WO | WO 02/21339 A2 | 3/2002 |
| WO | WO 03/009517 A2 | 1/2003 |
| WO | WO 03/021537 A1 | 3/2003 |
| ZA | 2005/09350 | 4/2008 |

OTHER PUBLICATIONS

U.S. Appl. No. 11/072,188, filed Mar. 4, 2005 entitled "Method and Apparatus for Utilizing an Object Model to Manage Document Parts for Use in an Electronic Document".
U.S. Appl. No. 11/072,659, filed Mar. 4, 2005 entitled "Method and Apparatus for Utilizing an Extensible Markup Language Schema to Defined Document Parts for Use in an Electronic Document".
U.S. Appl. No. 11/398,339, filed Apr. 5, 2006 entitled "Structuring Data for Word Processing Documents".
U.S. Appl. No. 11/445,903, filed Jun. 2, 2006 entitled "Structuring Data for Presentation Documents".
U.S. Appl. No. 11/431,931, filed May 10, 2006 entitled "Exposing Embedded Data in a Computer-Generated Document".
U.S. Appl. No. 11/389,367, filed Mar. 24, 2006 entitled "Structuring Data for Spreadsheet Application Documents".
U.S. Appl. No. 10/955,622, filed Sep. 30, 2004 entitled "Method, System, and Computer-Readable Medium for Creating, Inserting and Reusing Document Parts in an Electronic Document".
U.S. Appl. No. 11/018,718, filed Dec. 20, 2004 entitled "File Formats, Methods, and Computer Program Products for Representing Documents".
U.S. Appl. No. 11/018,569, filed Dec. 20, 2004 entitled "Method and System for Linking Data ranges of a Computer-Generated Document with Associated Extensible Markup Language Elements".
U.S. Appl. No. 11/019,095, filed Dec. 21, 2004 entitled "Method and System for Exposing Nested Data in a Computer-Generated Document in a Transparent Manner".

U.S. Official Action mailed May 12, 2006 in U.S. Appl. No. 10/731,900.
U.S. Appl. No. 11/125,907, filed May 10, 2005, entitled "Structuring an Electronic Document for Efficient Identification and Use of Document Parts,".
U.S. Appl. No. 10/731,900, filed Dec. 9, 2003, entitled "Context Free Document Portions,".
U.S. Appl. No. 11/018,405, filed Dec. 20, 2004, entitled "Context Free Document Portions With Alternate Formats,".
U.S. Appl. No. 11/018,718, filed Dec. 20, 2004, entitled "File Formats, Methods, and Computer Program Products for Representing Documents", Inventors: Jones et al.
U.S. Appl. No. 11/018,910, filed Dec. 20, 2004, entitled "File Formats, Methods, and Computer Program Products for Representing Presentations", Inventors: Villaron et al.
U.S. Appl. No. 11/018,912, filed Dec. 20, 2004, entitled "File Formats, Methods, and Computer Program Products for Representing Workbooks", Inventors: Rothschiller et al.
"@try inCSS3 (was: Useragent Rules in CSS)", http://lists.w3.org/Archives/Public/www-style/2004Mar/0333.html, 2 pages (Mar. 31, 2004).
"Apache Server Frequently Asked Questions", Apache HTTP Server Version 1.3, http://httpd.apache.org/docs/1.3/misc/FAQ.html; 43 pages.
"Controlling the Data Chaos by Adding Intelligence to Media", 4 pages (2004).
"Networked File System", http://www.scit.wlv.ac.uk/~jphb/comms/nfs.htm; 7 pages.
"Open eBook Publication Structure 1.2", http://www.idpf.org/oebps/oebps1.2/download/oeb12-xhtml.htm, 71 pages (Aug. 27, 2002).
Anonymous: "Technical note TN2073: Deconstructing A Keynote 1.x Document: Part One—Slides," Online Publication, May 20, 2003, XP002404031, Retrieved from the Internet: URL:http:////developer.apple.com/technotes/tn2002/pdf/tn2073.pdf on Oct. 20, 2006, 27 pp.
Anonymous: "Technical Note 2067: About the Keynote XML File Format (APXL Schema)," Online Publication, Feb. 12, 2003, XP002404032; Retrieved from the Internet: URL:http://developer.apple.com/technotes/tn2002/pdf/tn2067.pdf on Oct. 20, 2006, 26 pp.
Anonymous: "Mulberry Slideshow XML (v 2.1): A User's Guide," Online Publication, Dec. 7, 2001, XP002404033; Retrieved from the Internet: URL:http://www.mulberrytech.com/slideshow/Mulberry-slideshow.zip on Oct. 20, 2006, 17 pp.
Bauer M. et al., "Open Office Specification 1.0," Online Publication, Mar. 22, 2004, XP002404030; Retrieved from the Internet: URL:http://www.oasis-open.org/committees/download.php/6037/office-spec-1.0-cd-1.pdf on Oct. 20, 2006, 607 pp.
Bleuthman et al., "Interleaved Graphics and Text", IBM Technical Disclosure Bulletin, vol. 22, No. 11, pp. 4813-4815 (Apr. 1980).
Chien et al., "Efficient Schemes for Managing Multiversion XML Documents", The VLDB Journal, vol. 11, pp. 332-353 (2002).
Christodoulakis et al., "Multimedia Document Presentation, Information, Extraction, and Document Formation in MINOS: A Model and a System", ACM Transactions on Office Information Systems, vol. 4, No. 4, pp. 345-383 (Oct. 1986).
El-Kwae et al., "Document Image Representation Using XML Technologies", Proceedings of SPIE, vol. 4670, pp. 109-120 (2002).
Ellis, "Postscrip, Bezier Curves and Chinese Characters", ACM, pp. 162-165 (1989).
Girardot et al., "Efficient Representation and Streaming of XML Content Over the Internet Medium", IEEE, pp. 67-70 (2000).
Han et al., "WebSplitter: A Unified XML Framework for Multi-Device Collaborative Web Browsing", ACM, pp. 221-230 (2000).
Hardy et al., "Mapping and Displaying Structural Transformations Between XML and PDF", ACM 2002, pp. 95-102 (2002).
Holman, "What is XSL-FO", Google Mar. 20, 2002, http://www.xml.com/pub/a/2002/03/20/xsl-fo.html, 18 pages.
Jacobs et al., "Adaptive Grid-Based Document Layout", ACM Transactions on Graphics, vol. 22, No. 2, pp. 838-847 (Jul. 2003).
Marco et al., "A Framework for Designing and Implementing the Ada Standard Container Library", ACM, pp. 49-61 (2003).
Meyer, O. "aTool—Creating Validated XML Documents on the Fly Using MS Word", pp. 113-121 (Oct. 2002).
Microsoft Word, (hereinafter Word), pp. 1-4 (Copyright 2001).
Miller, "An Introduction to the Resource Description Framework", D-Lib Magazine, ISSN 1082-9873, http://www.dlib.org/dlib/may98/miller/05miller.html, 10 pages (May 1998).
Obasanjo, "Designing Extensible, Versionable XML Formats", Google Jul. 21, 2004, http://www.xml.com/pub/a/2004/07/21/design.html, 17 pages.
Obasanjo, "Designing XML Formats: Versioning vs. Extensibility", Google 2004, blogs.msdn.com/dareobasanjo/archive/2004/04/11/111369.aspx. One additional page is included to show the actual date of the article which is Nov. 17, 2004, 24 pages.
Obasanjo, Designing XML Formats: Versioning vs. Extensibility, Google Apr. 11, 2004, blogs.msdn.com/dareobasanjo/archive/2004/04/11/111369.aspx, 3 pages.
Office Action Correspondence Subsystem, version 1.3 (herein after OACS), copyright Feb. 2003, pp. 1-2 to 1-123, 2-2 to 2-122 and 3-2 to 3-44).
OpenOffice.org, ".OpenOffice.org User Guide for Version 1.1.x: Chapter 4: Spreadsheets in Calc", published May 7, 2004, pp. 1, 2, 179-254, http://documentation.openoffice.org/manuals/OO01.x.x/user_guide.pdf.
OpenOffice.org, "OpenOffice.org User Guide for Version 1.1.x: Chapter 5: Creating Presentations With Impress", published May 7, 2004, pp. 1, 2, 255-286, http://documentation.openoffice.org/manuals/OO01.x.x/user_guide.pdf.
Orchard, "Versioning XML Vocabularies", published on XML.com Dec. 3, 2003, http://web.archive.org/web/20031206005000/www.xml.com/pub/a/2003/12/03/versioning.html (This item is from the Internet Archive of xml.com dated Dec. 12, 2003), 12 pages.
Pawson, "Printing from XML: An Introduction to XSL-FO,", Google Oct. 9, 2002, http://www.xml.com/pub/a/2002/10/09/xslfo.html, 6 pages.
Peters et al., "CrystalWeb—A Distributed Authoring Environment for the World-Wide Web," Computer Networks and ISDN Systems, vol. 27, No. 6, pp. 861-870 (Apr. 1995).
ReplyAssistant, pp. 1-34 (Copyright 2001).
Sahuguet et al., "Building Intelligent Web Applications Using Lightweight Wrappers", Data and Knowledge Engineering, vol. 36, pp. 283-316 (2001).
StarOffice 7 Office Suite, A Sun ONE Software Offering, Basic Programmer's Guide, pp. 1-10, 47, 91, 104 (Jul. 2003).
Steele, "Easy Microsoft Office Word 2003", published Sep. 19, 2003, Que Corporation, pp. 52, 53 and 216 (6 total pages).
Unknown, ReplyAssistant Version 1.1, downloaded from < http://www.goldmedalsoft.com/shareware/Business_Finance-Miscellaneous-ReplyAssistant-1.1.html>, Copyright 2000-2001, 7 figures, 5 pages ReadMet, 1 page About ReplyAssistant, 15 pages.
van Leeuwen et al., "XML for Flexibility and Extensibility of Design Information Models", Proceedings of CAADRIA, University of Sydney, Australia, pp. 491-502 (2001).
Whitmer, R., "Document Object Model (DOM) Level 3 Xpath Specification", W3C, http://www.w3.org/TR/DOM-Level-3-XPath/, Feb. 26, 2004, Version 1.0, 18 pages.
U.S. Official Action mailed Feb. 28, 2007 in U.S. Appl. No. 10/731,900.
U.S. Official Action mailed Aug. 9, 2007 in U.S. Appl. No. 10/731,900.
U.S. Official Action mailed Sep. 20, 2005 in U.S. Appl. No. 10/836,326.
U.S. Official Action mailed May 31, 2006 in U.S. Appl. No. 10/836,326.
U.S. Official Action mailed Oct. 20, 2006 in U.S. Appl. No. 10/836,326.
U.S. Official Action mailed Apr. 9, 2007 in U.S. Appl. No. 10/836,326.
U.S. Official Action mailed Jul. 26, 2007 in U.S. Appl. No. 10/836,326.
U.S. Official Action mailed Feb. 22, 2008 in U.S. Appl. No. 10/836,327.
U.S. Official Action mailed Jun. 28, 2006 in U.S. Appl. No. 10/836,608.
U.S. Official Action mailed Dec. 12, 2006 in U.S. Appl. No. 10/836,608.

U.S. Official Action mailed Mar. 8, 2007 in U.S. Appl. No. 10/836,608.
U.S. Official Action mailed Jul. 27, 2007 in U.S. Appl. No. 10/836,608.
U.S. Official Action mailed Jan. 24, 2005 in U.S. Appl. No. 10/837,040.
U.S. Official Action mailed Jul. 15, 2005 in U.S. Appl. No. 10/837,040.
U.S. Official Action mailed Oct. 18, 2005 in U.S. Appl. No. 10/837,040.
U.S. Official Action mailed Apr. 6, 2006 in U.S. Appl. No. 10/837,040.
U.S. Official Action mailed Sep. 29, 2006 in U.S. Appl. No. 10/837,040.
U.S. Official Action mailed Dec. 19, 2006 in U.S. Appl. No. 10/837,040.
U.S. Official Action mailed May 15, 2007 in U.S. Appl. No. 10/837,040.
U.S. Official Action mailed Jun. 14, 2007 in U.S. Appl. No. 10/955,622.
U.S. Official Action mailed Mar. 17, 2008 in U.S. Appl. No. 10/955,622.
U.S. Official Action mailed Aug. 2, 2007 in U.S. Appl. No. 11/018,405.
U.S. Official Action mailed Feb. 21, 2007 in U.S. Appl. No. 11/018,569.
U.S. Official Action mailed Mar. 18, 2008 in U.S. Appl. No. 11/018,569.
U.S. Official Action mailed Jun. 19, 2007 in U.S. Appl. No. 11/018,718.
U.S. Official Action mailed Mar. 21, 2007 in U.S. Appl. No. 11/018,910.
U.S. Official Action mailed Oct. 3, 2007 in U.S. Appl. No. 11/018,910.
U.S. Official Action mailed Oct. 1, 2007 in U.S. Appl. No. 11/018,912.
U.S. Official Action mailed May 8, 2007 in U.S. Appl. No. 11/072,188.
U.S. Official Action mailed Dec. 28, 2007 in U.S. Appl. No. 11/072,188.
U.S. Official Action mailed Sep. 17, 2007 in U.S. Appl. No. 11/072,659.
U.S. Official Action mailed Feb. 4, 2008 in U.S. Appl. No. 11/125,907.
U.S. Official Action mailed Aug. 29, 2006 in U.S. Appl. No. 11/222,344.
U.S. Official Action mailed Feb. 22, 2007 in U.S. Appl. No. 11/222,344.
U.S. Official Action mailed Aug. 1, 2007 in U.S. Appl. No. 11/222,344.
U.S. Official Action mailed Oct. 3, 2006 in U.S. Appl. No. 11/222,442.
U.S. Official Action mailed Feb. 20, 2007 in U.S. Appl. No. 11/222,442.
U.S. Official Action mailed Jul. 10, 2007 in U.S. Appl. No. 11/222,442.
U.S. Official Action mailed Jun. 18, 2007 in U.S. Appl. No. 11/398,339.
U.S. Official Action mailed Mar. 25, 2008 in U.S. Appl. No. 11/398,339.
European Search Report dated Nov. 3, 2006 in EP 05111509.5.
European Search Report dated Dec. 19, 2007 in EP 05111677.0.
European Search Report dated Dec. 19, 2007 in EP 05111375.1.
European Search Report dated Dec. 19, 2007 in EP 05112123.4.
European Examination Report dated Mar. 3, 2008 in EP 05111375.1.
U.S. Official Action dated Mar. 7, 2007 in U.S. Appl. No. 11/018,912.
U.S. Official Action dated Jul. 26, 2007 in U.S. Appl. No. 11/018,569.
Orchard et al. "[Editorial Draft] Versioning XML Languages W3C Proposed TAG Finding", http://www.w3.org/2001/tag/doc/versioning-20031116, Nov. 16, 2003, pp. 1-23.
Stop Typing the Same Thing, Website Documentation and Screendumps, 4Office Automation Inc., http://web.archive.org/web/20020418015130, http://www.4officeautomation.com/ReplyAssistant, copyright 2002, 4 pp. from download software.
U.S. Official Action mailed Jul. 22, 2008 in U.S. Appl. No. 11/072,188.
U.S. Official Action mailed Oct. 30, 2008 in U.S. Appl. No. 11/125,907.
U.S. Official Action mailed Nov. 14, 2008 in U.S. Appl. No. 11/072,659.
U.S. Official Action mailed Jan. 23, 2009 in U.S. Appl. No. 11/389,367.
U.S. Official Action mailed Feb. 4, 2009 in U.S. Appl. No. 11/445,903.
European Search Report dated Nov. 30, 2007 in EP 05105111.8.
European Examination Report dated Mar. 14, 2008 in EP 05105111.8.
Chinese Office Action dated Jul. 18, 2008 in 20051012679.6.
Chinese Office Action dated Aug. 1, 2008 in 200510126798.5.
Chinese Office Action dated Aug. 22, 2008 in 200510125059.04.
Chinese Office Action dated Oct. 31, 2008 in 200510125058.X.
European Search Report dated Dec. 15, 2008 in EP 05111511.1.
Chinese First Office Action dated Jan. 9, 2009 in 200510127115.8.
Chinese Second Office Action dated Jan. 16, 2009 in 200510125062.6.
Chinese Second Office Action dated Feb. 6, 2009 in 200510126789.6.
Chinese First Office Action dated Feb. 6, 2009 in 200510088462.4.
European Communication dated Mar. 12, 2009 in EP 05111375.1.
Jones, B., "Word XML's Context Free Chunks: Building a Document from Multiple Pieces of Content", http://blogs.msdn.com/brian_jones_archive/2005/07/20/441167.aspx, Jul. 20, 2005, 4 pp.
Carrano, "Data Abstraction and Problem Solving with C++", copyright 1995, pp. 14-16.
U.S. Official Action mailed Apr. 16, 2009 in U.S. Appl. No. 11/072,188.
PCT Search Report dated Jul. 3, 2007 in PCT/US2006/21825.
European Communication dated Mar. 26, 2008 in EP 05112123.4.
Chinese Office Action dated Aug. 1, 2008 in 200510125062.6.
Chinese Second Office Action dated Mar. 6, 2009 in 200510126798.5.
European Search Report dated Mar. 11, 2009 in EP 05111550.9.
Adobe Creative Team, "Adobe Acrobat 5.0 Classroom in a Book", published Jun. 26, 2001, Adobe Press, pp. 1-26+cover page (27 pp.).
Chinese Second Office Action dated Mar. 13, 2009 in 200480001395.1 (308874.04), pp. 1-7.
Chinese Second Office Action dated Mar. 27, 2009 in 20040001339.08 (304846.04), pp. 1-7.
Chinese Decision on Rejection dated Mar. 27, 2009 in 200480001336.4 (308877.04), pp. 1-17.
Chinese Decision on Rejection dated May 8, 2009 in 200510125059.04 (60001.0441CC01), pp. 1-14.
Chinese Third Office Action dated Jun. 5, 2009 in 200510126789.6 (60001.0443CC01), pp. 1-7.
Russian Official Action dated Jan. 13, 2008 in 2412-139543RU/8132 (304698.10), pp. 1-9.
European Communication dated Jul. 10, 2009 in EP 05111511.Jan. 1527 (60001.0440EP01), pp. 1-5.
Chinese Second Office Action dated Jun. 5, 2009 in 200480001312.9, pp. 1-9.
Gudgin, M., "SOAP Version 1.2 Part 1: Messaging Framework", W3C Candidate Recommendation (Dec. 19, 2002), pp. 1-65.
Chinese Third Office Action dated Jul. 17, 2009, in 200480001395.01, pp. 1-7.
Proydakov, E.M., "English-Russian Explanatory Dictionary in Computing Engineering, Internet, and Programming", Moscow: publishing house "Russian edition", 2001, pp. 1-3.

* cited by examiner

MANAGEMENT AND USE OF DATA IN A COMPUTER-GENERATED DOCUMENT

CROSS-REFERENCE TO RELATED APPLICATIONS

This patent application is related to and filed with U.S. patent application Ser. No. 11/018,718, entitled "File Formats, Methods, and Computer Program Products For Representing Documents," filed on Dec. 20, 2004; U.S. patent application Ser. No. 11/018,910, entitled "File Formats, Methods, and Computer Program Products For Representing Presentations," filed on Dec. 20, 2004; and U.S. patent application Ser. No. 11/018,912, entitled "File Formats, Methods, and Computer Program Products For Representing Workbooks," filed on Dec. 20, 2004; all of which are assigned to the same assignee as this application. The aforementioned patent applications are expressly incorporated herein, in their entirety, by reference.

FIELD OF THE INVENTION

The present invention generally relates to managing data across different computer-generated documents. More particularly, the present invention relates to improved management and use of components of a computer-generated document.

BACKGROUND OF THE INVENTION

With the advent of the computer age, computer and software users have grown accustomed to user-friendly software applications that help then write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

Documents created by such applications are typically difficult to use on any application other than the application responsible for generating the document. Most computer-generated documents contain many streams of information or data, for example, text, tables, pictures, inserted objects, and the like, but typically the applications generating those documents do not break the documents into individual streams of information. Users often desire to use or manipulate such documents using applications other than the application responsible for generating the document. For example, users often desire to re-use a portion of a document or make a quick change to a portion of a document without having to open the entire document. This is especially the case where documents are stored in shared collections available to multiple users working in a collaborative environment.

There is a need for an improved method and system for managing and using data across different types of applications. It is with respect to these and other considerations that the present invention has been made.

SUMMARY OF THE INVENTION

Embodiments of the present invention solve the above and other problems by providing methods and systems for breaking a computer-generated document into a number of components or portions of data where the components or portions of data have explicit relationships with each other. A user may then navigate the relationships between the components or portions of data to quickly understand the nature of the document and the components and data comprising the document. Particular components or portions of the document that are of interest to a user may be easily located. In addition, the user may open, edit and reuse particular portions of the document apart from the rest of the document and without having to open or edit the document.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for breaking a computer-generated document into a number of components or portions of data or other content and for establishing relationships between each of the components of the document for allowing a user to quickly determine the makeup of the document and for allowing processing and re-use of components of the document independent of each other. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
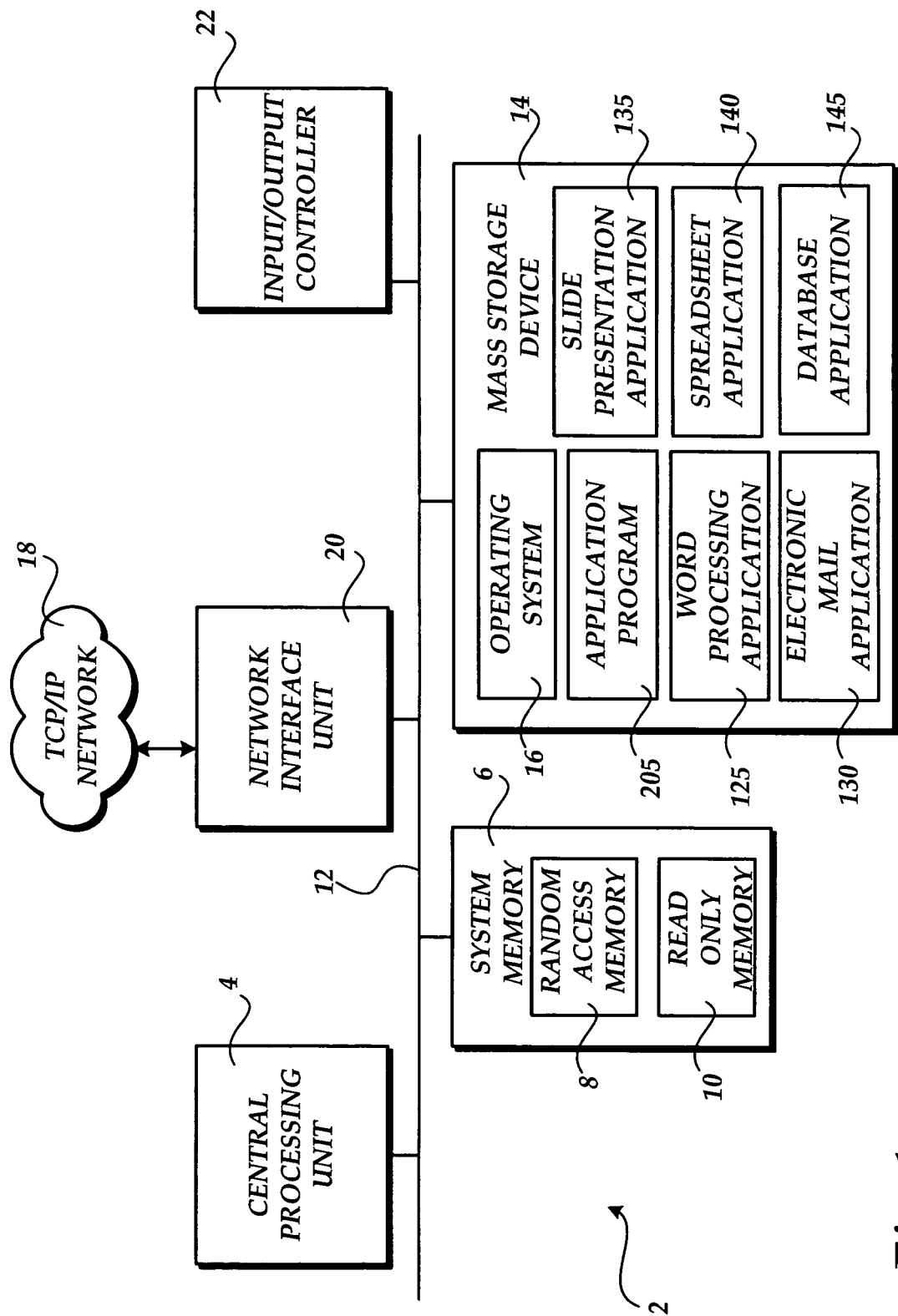
FIG. 1 is a block diagram showing the architecture of a personal computer that provides an illustrative operating environment for embodiments of the present invention.

Referring now to the drawings, in which like numerals refer to like elements through the several figures, aspects of the present invention and an exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Washington. The mass storage device 14 and RAM 8 may also store one or more application programs. In particular, the mass storage device 14 and RAM 8 may store an application program 205 for providing a variety of functionalities to a user. For instance, the application program 205 may comprise many types of programs such as a word processing application, a spreadsheet application, a desktop publishing application, and the like. According to an embodiment of the present invention, the application program 205 comprises a multiple functionality software application suite for providing functionality from a number of different software applications. Some of the individual program modules that may comprise the application suite 205 include a word processing application 125, a slide presentation application 135, a spreadsheet application 140 and a database application 145. An example of such a multiple functionality application suite 205 is OFFICE manufactured by Microsoft Corporation. Other software applications illustrated in FIG. 1 include an electronic mail application 130.

Figure 2:
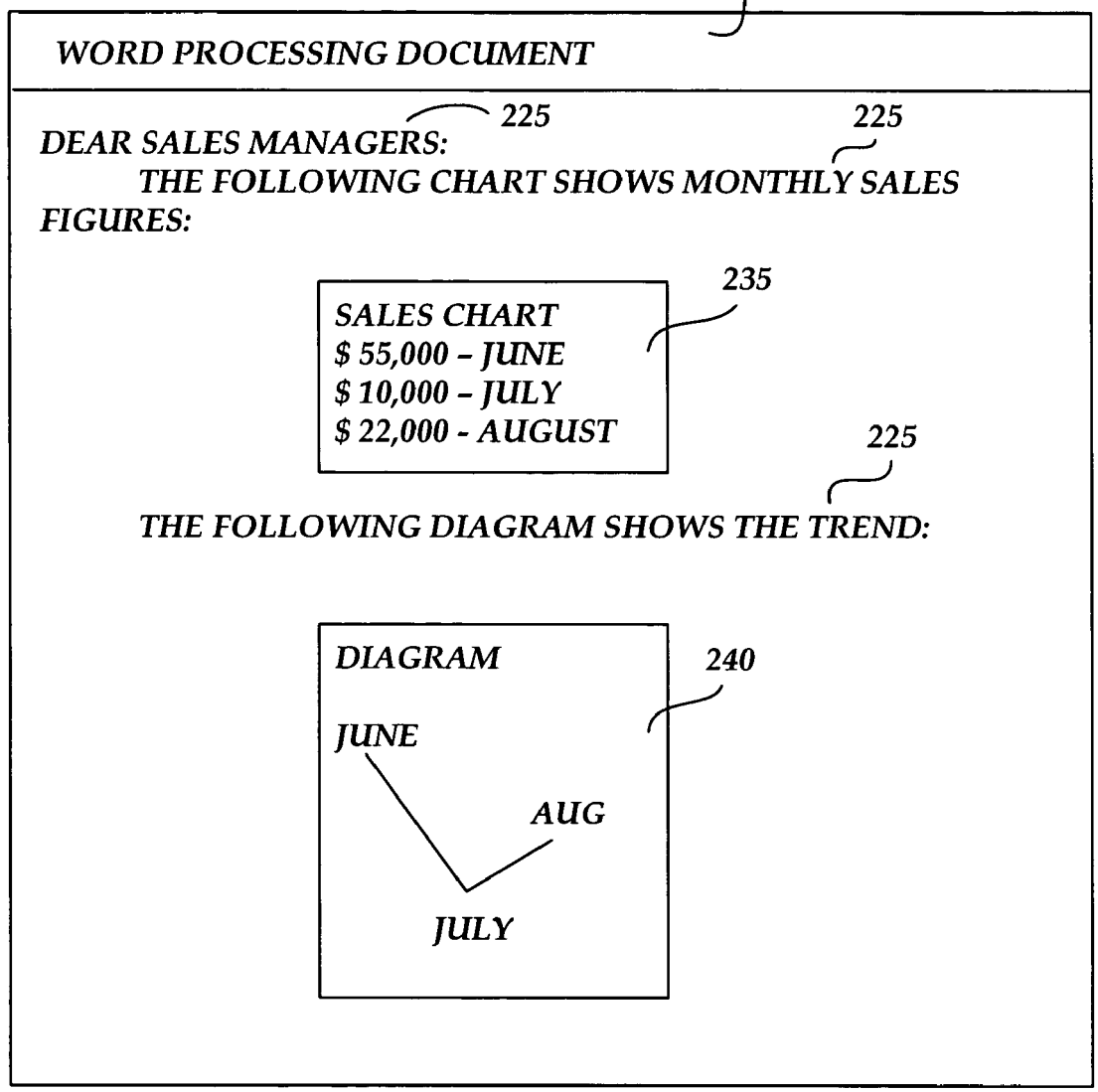
FIG. 2 is a simplified block diagram illustrating a word processing document having a text object, a spreadsheet object, and a slide presentation object according to embodiments of the present invention.

FIG. 2 is a simplified block diagram illustrating a word processing document having a text object, a spreadsheet object, and a slide presentation object according to embodiments of the present invention. As shown in FIG. 2, a word processing document 220 is illustrated, for example, a memorandum to sales managers of an organization, and the document includes various components. For example, the document illustrated in FIG. 2 includes two text components 225, a spreadsheet component 235 and a slide presentation component 240. As should be understood by those skilled in the art, the document illustrated in FIG. 2 is for purposes of example only and is not intended to be limiting of the operation or scope of the present invention. It will be appreciated that embodiments of the present invention may be utilized with respect to a vast number of computer-generated documents containing various document objects.

Referring still to FIG. 2, the document 220 is representative of a compound-document made up of various components each of which may be generated according to different formatting types and each of which may have a number of applied properties. For example, the document 220 contains text objects 225 which may be generated by a word processing application, a spreadsheet application, a slide presentation application, a text editing application, and the like. The spreadsheet object or component 235 is representative of a chart or other spreadsheet list or table that has been embedded in the word processing document 220 from a separate spreadsheet document. The slide presentation object or component 240 is an object that has been embedded into the word processing document from a slide presentation application document.

Each of the separate components embedded into the word processing document illustrated in FIG. 2 may have been generated by a separate software application. As such, each of the components may have different formatting types associated with the different applications responsible for their generation. Moreover, a number of different formatting properties, for example, styles, list types and fonts, may be applied to each of the objects or components of the document by their respective generating applications.

Figure 3:
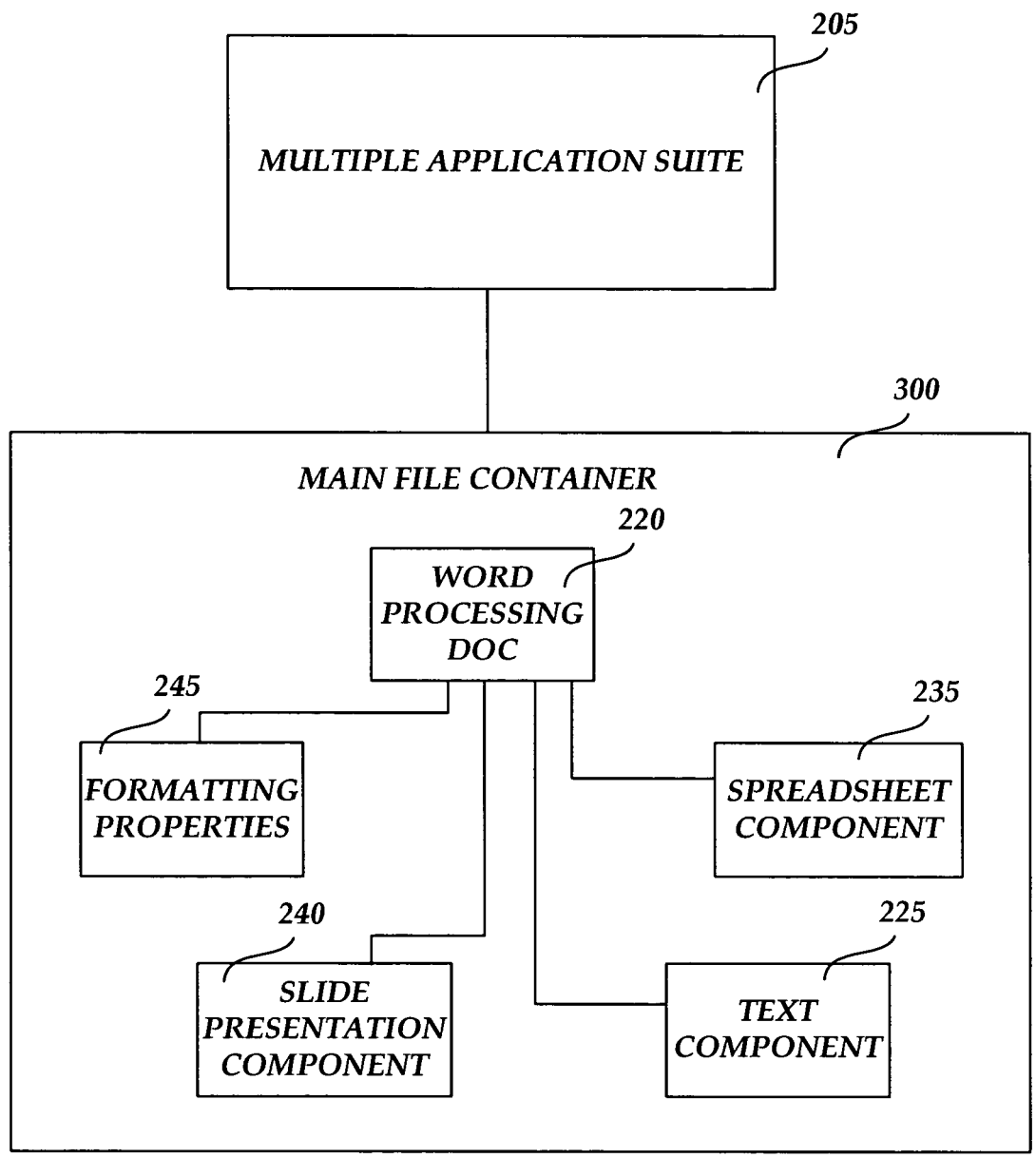
FIG. 3 is a simplified block diagram illustrating a relationship between a software application and a file container showing a relationship between components of a document according to embodiments of the present invention.

FIG. 3 is a simplified block diagram illustrating a relationship between a software application and a file container showing a relationship between components of a document. According to embodiments of the present invention, a computer-generated document 220, such as the word processing document illustrated in FIG. 2 is divided into individual pieces or components making up the document, and each of the various components or pieces making up the document is stored as separate components in a main file container.

As illustrated in FIG. 3, a multiple application software suite 205 is illustrated for operating in association with a main file container 300 containing components of a document such as the word processing document 220 illustrated in FIG. 2. The multiple application software suite 205 may include a number of different applications, for example, a word processing application, a spreadsheet application, a slide presentation application, a database application, and the like.

As briefly described above, when a document, such as the document 220, illustrated in FIG. 2, is assembled and represented as a collection of components according to embodiments of the present invention, each component of the document, for example, text objects, spreadsheet objects, slide presentation objects, formatting objects, and the like is separated into individual components that are stored in the main file container 300. According to one embodiment of the present invention, the main file container 300 may be in the form of a zip file. Accordingly, rather than having all of the components of the document stored as a single monolithic entity, the document is divided into the separate components making up the document where each of the components have explicit relationships to each other. As illustrated in FIG. 3, the word processing document 220 is illustrated having a relationship with a formatting properties object 245, the spreadsheet component or object 235, the slide presentation component or object 240 and the text components 225.

As referred to herein, a relationship between the components of a document defines a connection between two specific components in a document. One component is known as the "source" of the relationship, and the other component is known as the "target" of the relationship. Relationships have specific "types" which describe the role they play in the document (for example, one relationship type might be used to connect a chart to a paragraph of text). Examples of relationships between components of a document include bi-directional relationships that may be traversed in one direction as easily as the other direction. Such bi-directional relationships may eliminate the distinction between source components and target components. Other example relationships between components allow for multiple targets or multiple sources. Other example relationships include relationships that point to components stored outside a document (for example, a word processing document with a relationship to a picture stored on a web server). Other relationships include relationships that carry additional data (other than just source, target and type). An example of such "additional data" includes a unique identifier that allows unambiguous reference to a specific relationship. Still other example relationships point to other relationships. Other example relationships carry data about a "subcomponent" or "subset" of a target component they point to, for example, a relationship that points to "cell B3 of spreadsheet ABC" instead of just "spreadsheet ABC."

A component "type" associated with components of a given document allow for efficiently finding certain components of the document when navigating the relationships between the components of the document. The relationship "type," as described above, does not identify the type of content of a particular component, but instead the relationship type identifies how a parent component of a given component uses the component. That is, it is the content type of the component that actually identifies the component. For example, for an image component of a document, the relationship type may be "image," but the content type associated with the component may be "JPEG" or "GIF."

According to embodiments of the present invention, assembling the document as a collection of individual components, as illustrated in FIG. 3, allows for the manipulation or processing of individual components outside a particular application responsible for the main document 220. For example, while the example document 220, illustrated in FIG. 2, is a word processing document, according to embodiments of the present invention, components of the word processing document may be accessed and managed or manipulated by other applications, as desired. For example, a user may select the main file container 300 for exposing the components of the word processing document 220 and the relationships between those components. If a user desires to make changes to the spreadsheet component 235, the user may launch the spreadsheet component 235 using a spreadsheet application, for example, for making edits to data and to presentation properties applied to the spreadsheet component. Similarly, a user/editor may open the slide presentation component 240 using a slide presentation application, for example, for making changes to the slide presentation. Likewise, the text component 225 may be opened using a word processing application, a text editing application, and the like for making changes to the text components of the main document 220. Additionally, other objects, for example, the formatting properties object 245, may be accessed for allowing individual processing or manipulation of those properties.

In addition, just as each of the separate components of the main document may be opened, manipulated or otherwise processed, each of the components may similarly be reused in other application documents. For example, if it is desired that the spreadsheet component 235 be used for a different document, that component may be easily accessed and copied to or otherwise associated with a different document.

These embodiments of the present invention are particularly useful for collaborative work environments. For example, if the word processing document 220 is being generated by a corporate vice president of a sales organization, each of the embedded objects, for example, the sales chart object 235 and the slide presentation diagram 240, may be generated by employees of the organization separately from the main document 220. Each of those generated objects may be portions of separate documents maintained on a shared workspace, such as a server in a large organization. Accordingly, the authors/editors of the individual components making up the document may access those components for making edits or changes.

For example, say the author/editor of the word processing document 220 desires that the slide presentation diagram object 240 be presented as a pie chart instead of a line chart. According to embodiments of the present invention, the author/editor of the word processing document 220, or another person responsible for the object 240 may launch the object 240 using a separate application and may make changes to the object 240 so that the presentation of the object is in a pie chart format as opposed to a line chart format. Because the main document 220 has an explicit relationship with the slide presentation object and because the main document 220 points to the slide presentation component or object 240, according to embodiments of the present invention, the next time the word processing document 220 is launched, the slide presentation diagram object 240 will be presented in the word processing document 220 as a pie chart instead of the line chart, illustrated in FIG. 2. Thus, different members of a collaborative working environment or team may access different components of a given document for making individual or global changes to those components.

The ability to open, utilize and edit individual components is also important because the main document, for example, the word processing document 220, may be formatted with a highly structured formatting language, such as the Extensible Markup Language (XML). For example, an author/editor of the main document may have applied complex XML markup structure to the word processing document 220. According to embodiments of the present invention, each of the components of the document may be accessed and edited without opening the main document and potentially corrupting or otherwise changing the highly structured nature of the main document.

As briefly mentioned above, according to embodiments of the present invention, a document 220 is assembled and stored as a collection components and objects comprising the document, and an explicit relationship between each of the components is generated. Each of the components comprising a given document are not inserted "in line" into the main document. Instead, the main document points to the location of the individual components comprising the main document. As should be understood, each of the components of the main document may be located and stored separately from the main document. This is especially the case in a collaborative working environment where different users of different components of the main document may be located distances from each other. For example, the main document may be generated and stored on a computer operating in a distributed computing environment such as an intranet or across components of the Internet. Accordingly, the spreadsheet component 235 may be located on a computing server accessible by the word processing document 220 across a distributed computing environment. Thus, the word processing document 220 may point to the spreadsheet component 235 at its stored location. Similarly, each of the other components of the document may be stored separately and may be pointed to by the word processing document.

According to embodiments of the present invention, components of the document may be stored in the container in their native formats. For example, a given component may have been created according to a binary format, a Hypertext Markup Language (HTML) format, a rich text format (RTF) and the like. Information may be associated with each such component to inform the application 205 used for generating and/or editing the main document of the formats associated with individual components so that the application 205 may process the components according to their native formats or transform the components to a suitable format as required. For a detailed discussion of utilizing document portions of varying file formats in a computer-generated document, see U.S. patent application Ser. No. 10/731,900, filed Dec. 9, 2003, entitled "Context Free Document Portions," which is incorporated herein by reference as if fully set out herein, and see United States Patent Application, Attorney Docket No. 60001.0453USI1, Applicant Matter No. 310158.01, entitled "Context-Free Document Portions With Alternate Formats," which is incorporated herein by reference as if fully set out herein.

According to embodiments of the present invention, when the main document is launched for display or editing, each of the pointed-to components is merged with the main document to allow the main document to be displayed and to be edited. Just as each of the components may be accessed and edited separately, so may each of those components be edited as part of the main document, and edits or changes to individual components made in the main document may be passed back to the individual components for live updates of those individual components when edits are made to the main document.

Figure 4:
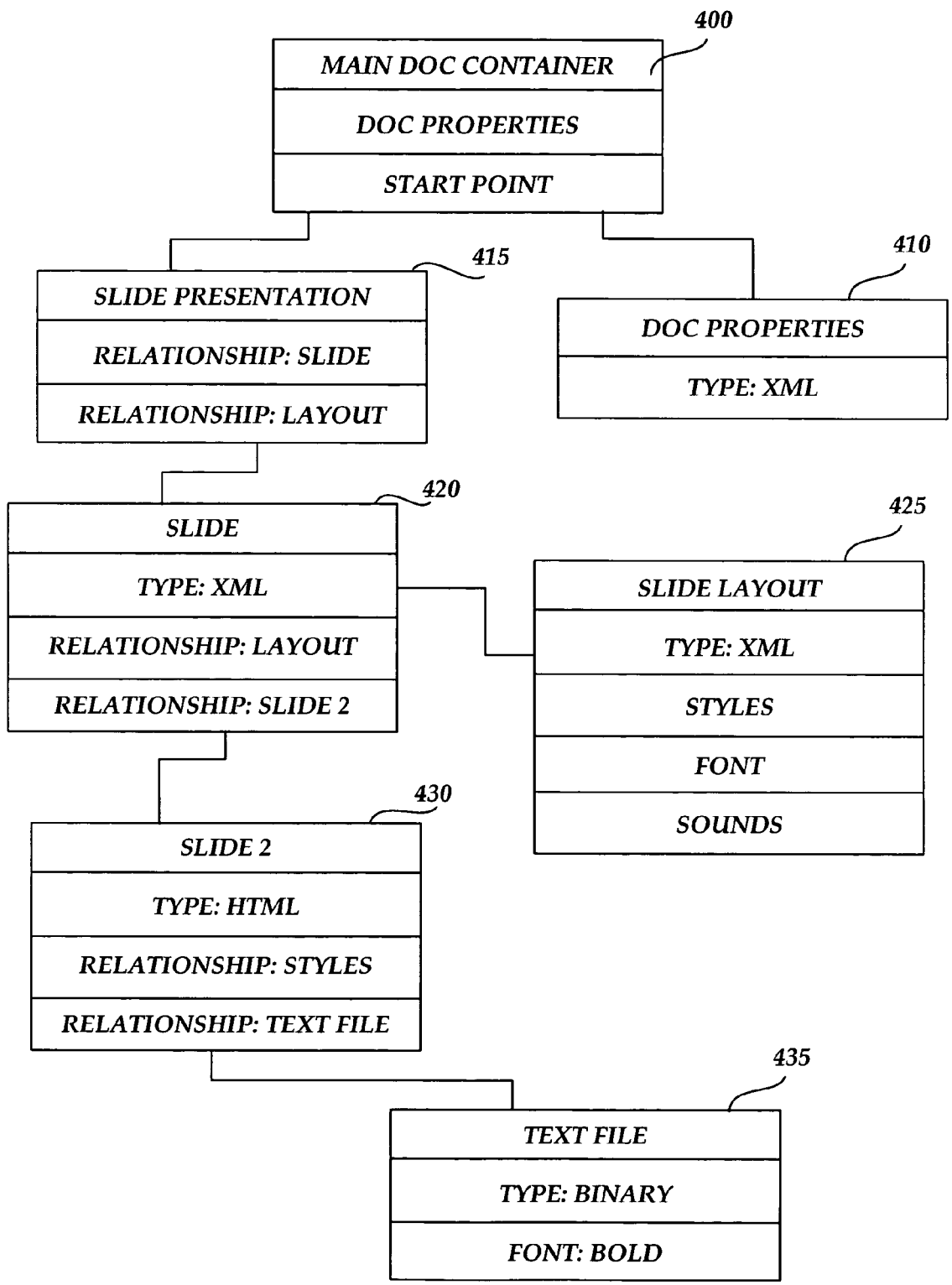
FIG. 4 is a simplified block diagram illustrating explicit relationships between components of a document according to embodiments of the present invention.

As briefly described above, when the main document is generated and saved as a collection of separate components, explicit relationships between each of the components and between the components and the main document are established in a relationship representation. FIG. 4 is a simplified block diagram illustrating explicit relationships between components of a document according to embodiments of the present invention. As should be understood, the hierarchical relationship representation illustrated in FIG. 4 is a more complex representation of relationships between components of a main document as the relationship illustrated in the main file container 300, illustrated in FIG. 3.

Referring to FIG. 4, a main document container 400 is illustrated for representing the relationship between components of an example slide presentation document. The main document container 400 includes a document properties field and a start point field. As should be understood by those skilled in the art, the main document container may include various other fields for relating the main document container to various objects associated with the main document container. A relationship with the start point field of the main document container 400 is shown to a slide presentation object 415. In the slide presentation object, a first relationship field navigates to a slide object 420. The slide object 420 is shown having a formatting type associated with the Extensible Markup Language. A relationship field of the slide object 420 maps to a slide layout object 425 showing fields for identification of the formatting type and formatting properties associated with the layout of the slide object 420.

The slide object 420 includes a relationship field mapping the slide object 420 to a second slide object 430. The second slide object 430 is illustrated having a formatting type associated with the Hypertext Markup Language. Additionally, a relationship field in the slide object 430 points to or maps to a text file object 435. Referring back to the main document container 400, the document properties field of the main document container 400 points to a document properties object 410 showing a document formatting type associated with the Extensible Markup Language.

As illustrated in FIG. 4, the example slide presentation document has been divided into individual components and property objects making up the document. According to embodiments of the present invention, when the main document container 400 is launched, each of the components of the main document container may be seen with the explicit relationships to those components illustrated. Accordingly, a user may navigate the hierarchical representation of the components of the main document container to quickly learn the identity and nature of the components, to access individual components for editing those components, or for reusing those components in a separate document. As described above with reference to FIG. 3, each of the individual components may be accessed according to other applications, as desired.

Because of the explicit hierarchical relationship between the components of the document, a user may quickly understand the nature of changes made to any individual component. For example, from a quick review of the structure illustrated in FIG. 4, a user may learn that to affect changes to the layout associated with the first slide object 420, the user may access the slide layout object 425 for affecting changes. For example, if the font of text or images contained in the slide object 420 requires editing, a user may quickly navigate to the slide layout object 425 for making changes to the font properties associated with the slide layout.

Similarly, if a user desires to make changes to a text file associated with the second slide object or component 430, the user may quickly navigate the hierarchical relationship representation to determine that the text file object or component 435 is explicitly related to the second slide object or component 430. Using a word processing application or text editing application, the user may launch the text file object or component 435 to make changes to the text file. Once the main document associated with the document container 400, for example, a slide presentation document, is subsequently launched, the changes made to the text component 435 will be automatically persisted in the related slide component 430. Accordingly, the editor of the text file object or component 435 has affected changes to the text file without any changes to the structure of the slide object 430 to which the text file is associated.

As described herein, embodiments of the present invention provide for the parsing of a computer-generated document into individual components comprising the document. Each of the individual components is stored, maintained or pointed to by a main file container in which is maintained a hierarchical relationship representation showing the explicit relationships between each of the components of the associated document. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for managing components of a computer-generated document, comprising:
    assembling, by a computer, a plurality of components of a document as a collection of separate components in an electronic file container, wherein the plurality of components are located only within the electronic file container, the plurality of components comprising data objects making up the document, the data objects comprising two or more of a text object, a spreadsheet object, a presentation object, and a formatting object wherein the data objects have different formatting types and at least one applied property;
    generating a relationship representation of the document showing how each of one or more components relate to other components, wherein the relationship representation comprises a relationship between two or more of the plurality of components in the document, and wherein at least one of the two or more of the plurality of components in the relationship is a parent component, wherein the relationship comprises a relationship type, the relationship type identifying how the parent component uses at least one of the two or more of the plurality of components in the relationship, wherein the parent component comprises an image component, wherein the relationship type for the image component comprises an image, and wherein a content type associated with the image component comprises an image file type;
    establishing a link between any related components of the collection of separate components based on a relationship between the any related components;
    upon selection of the electronic file container, providing a visual representation of the collection of components and providing a visual representation of how each component of the collection of components relates to other components of the collection of components; and
    upon selection of a visual representation of one component of the document from the visual representation of the collection of components, providing access to a component of the document associated with the selected visual representation of one component of the document by launching the selected component associated with the selected visual representation, the selected component comprising a different application than an application utilized to launch the document in the electronic file container, for allowing editing of the selected component to make changes to the selected component apart from other components of the document so that when the application utilized to launch the document in the electronic file container is re-launched, the changes made to the selected component utilizing the different application are presented in the electronic file container.

2. The method of claim 1, further comprising allowing manipulation of the selected component associated with the selected visual representation, wherein the manipulation includes allowing copying of the selected component associated with the selected visual representation to a different document.

3. The method of claim 1, whereby upon launching the document, merging the collection of components of the document for presenting the document according to relationships between each of the components of the document.

4. The method of claim 1, whereby assembling a plurality of components of a document as a collection of separate components in an electronic file container includes assembling the collection of components in a zip format file.

5. A method for managing components of a computer-generated document, comprising:
    dividing, by a computer, the document into a plurality of components comprising the document;
    assembling each of the plurality of components of the document in an electronic file container, wherein each of the plurality of components are located only within the electronic file container, the plurality of components comprising data object making up the document, the data objects comprising two or more of a text object, a spreadsheet object, a presentation object, and a formatting objects, wherein the data objects have different formatting types and at least one applied property;
    representing a relationship between components of the document showing how each of one or more components of the document relate to other components of the document, wherein the relationship is represented by a relationship between two or more of the plurality of components comprising the document, and wherein at least one of the two or more of the plurality of components in the relationship is a parent component, wherein the relationship comprises a relationship type, the relationship type identifying how the parent component uses at least one of the two or more of the plurality of components in the relationship, wherein the parent component comprises an image component, wherein the relationship type for the image component comprises an image, and wherein a content type associated with the image component comprises an image file type;
    upon launching the document, merging each of the components of the document according to relationships between each of the components of the document; and
    upon selection of one component of the document assembled in the electronic file container, launching the selected component to allow editing of the selected component to make changes to the selected component apart from other components of the document so that when an application utilized to launch the document in the electronic file container is re-launched, the changes made to the selected component are presented in the electronic file container, wherein an application different than the application utilized to launch the document in the electronic file container is utilized to launch the selected component.

6. The method of claim 5, when representing a relationship between components of the document showing how each of one or more components of the document relate to other components of the document, establishing a link between each component of the document according to a relationship between each component of the document.

7. The method of claim 6, further comprising storing one or more of the components of the document in one or more locations separate from other components of the document.

8. The method of claim 5, further comprising upon selection of one component of the document assembled in the electronic file container, launching the selected component to allow editing of the selected component apart from other components of the document.

9. A computer-readable storage medium having stored thereon computer-executable instructions which when executed by a computer perform a method for managing components of a computer-generated document, comprising:

assembling, by a computer, a plurality of components of a document as a collection of separate components in an electronic file container, wherein the plurality of components are located only within the electronic file container, the plurality of components comprising data objects making up the document, the data objects comprising two or more of a text object, a spreadsheet object, a presentation object, and a formatting object, wherein the data objects have different formatting types and at least one applied property;

generating a relationship representation of the document showing how each of one or more components relate to other components, wherein the relationship representation comprises a relationship between two or more of the plurality of components in the document, and wherein at least one of the two or more of the plurality of components in the relationship is a parent component, wherein the relationship comprises a relationship type, the relationship type identifying how the parent component uses at least one of the two or more of the plurality of components in the relationship, wherein the parent component comprises an image component, wherein the relationship type for the image component comprises an image, and wherein a content type associated with the image component comprises an image file type;

establishing a link between any related components of the collection of separate components based on a relationship between the any related components;

upon selection of the electronic file container, providing a visual representation of the collection of components and providing a visual representation of how each component of the collection of components relates to other components of the collection of components; and upon selection of a visual representation of one component of the document from the visual representation of the collection of components, providing access to a component of the document associated with the selected visual representation of one component of the document by launching the selected component associated with the selected visual representation, the selected component comprising a different application than an application utilized to launch the document in the electronic file container, for allowing editing of the selected component to make changes to the selected component apart from other components of the document so that when the application utilized to launch the document in the electronic file container is re-launched, the changes made to the selected component utilizing the different application are presented in the electronic file container.

10. The computer-readable storage medium of claim 9 further comprising allowing manipulation of the selected component associated with the selected visual representation, wherein the manipulation includes allowing copying of the selected component associated with the selected visual representation to a different document.

11. The computer-readable storage medium of claim 9, wherein upon launching the document, merging the collection of components of the document for presenting the document according to relationships between each of the components of the document.

12. The computer-readable storage medium of claim 9, wherein assembling a plurality of components of a document as a collection of components in an electronic file container includes assembling the collection of components in a zip format file.

* * * * *